United States Patent
Huang et al.

(10) Patent No.: US 12,434,199 B2
(45) Date of Patent: Oct. 7, 2025

(54) PERMEATE TUBE MEMBER CORRECTION DEVICE

(71) Applicant: Xiamen DE-Filter New Material Co., Ltd, Xiamen (CN)

(72) Inventors: Mei Huang, Xiamen (CN); Hong Iiang Yang, Xiamen (CN)

(73) Assignee: Xiamen DE-Filter New Material Co., Ltd., Xiamen (CN)

( * ) Notice: Subject to any disclaimer, the term of this patent is extended or adjusted under 35 U.S.C. 154(b) by 202 days.

(21) Appl. No.: 18/216,603

(22) Filed: Jun. 30, 2023

(65) Prior Publication Data

US 2024/0316503 A1 Sep. 26, 2024

(30) Foreign Application Priority Data

Mar. 21, 2023 (CN) .......................... 202310277963.5

(51) Int. Cl.
   B01D 63/06 (2006.01)
(52) U.S. Cl.
   CPC ........ B01D 63/061 (2013.01); *B01D 2313/12* (2013.01)
(58) Field of Classification Search
   CPC .... B01D 63/06; B01D 63/061; B01D 63/062; B01D 63/063; B01D 63/065; B01D 63/066; B01D 63/067; B01D 63/068; B01D 63/069; B01D 2313/12; B01D 2313/125

See application file for complete search history.

(56) References Cited

FOREIGN PATENT DOCUMENTS

| | | | |
|---|---|---|---|
| CN | 211251320 U | * | 8/2020 |
| CN | 216324313 U | * | 4/2022 |
| JP | 2022001376 A | * | 1/2022 |

* cited by examiner

*Primary Examiner* — JaMel M Nelson
(74) *Attorney, Agent, or Firm* — Jose Cherson Weissbrot

(57) ABSTRACT

The present invention relates to a permeate tube member correction device used to improve the quality of permeate tube members and prevent deformation issues. The device comprises two fixed supports, one connected to a rotating shaft and the other mounted with a fixed plate. A hollow mandrel is rotated, causing a correction roller to roll along the inner wall of the permeate tube member, correcting its roundness and straightness. This prevents deformation caused by weight-induced cooling during production, ensuring better subsequent processing, installation, and use. Multiple correction rollers are inserted into the permeate tube member and expanded to contact its inner wall. This correction method applies circumferential rotation force, avoiding axial deformation caused by contact friction between the correction rollers and the inner wall when they enter the permeate tube member.

6 Claims, 9 Drawing Sheets

PERMEATE TUBE MEMBER CORRECTION DEVICE

CROSS REFERENCE TO THE RELATED APPLICATIONS

This application is based upon and claims priority to Chinese Patent Application No. 2023102779635, filed on Mar. 21, 2023, the entire contents of which are incorporated herein by reference.

TECHNICAL FIELD

The present invention relates to the technical field of permeate tube correction, in particular to a permeate tube member correction device.

BACKGROUND

In daily life, industrial production, chemical industry, laboratory, and other industries, a liquid separation process generally requires the use of a filtration and separation membrane module. The filtration and separation membrane module is a physical device including a membrane and its supporting structure, and the permeate tube is an essential part of the membrane module. In the production process of the permeate tube (permeate mesh tube of filter element), plastic particles are first melted by screw extrusion, then cooled for shaping, and finally cut to form the main body of the permeate tube.

During the cooling and shaping process of the permeate tube, the roundness and straightness of the permeate tube member is prone to deformation to a certain extent due to the weight of the permeate tube member itself, which reduces the quality of the permeate tube member and somewhat affects the subsequent processing, installation, and use of the permeate tube member. If the permeate tube member is corrected in the traditional reciprocating movement and penetration manner after the permeate tube member is primarily cooled, the incompletely shaped permeate tube member is prone to axial deformation, thus hardly achieving an ideal correction effect. Therefore, there is an urgent need for a permeate tube member correction device.

SUMMARY

To solve the above-mentioned problem, the present invention adopts the following technical solution. A permeate tube member correction device includes two fixed supports, where one fixed support is rotatably connected to a rotating shaft, and the other fixed support is fixedly mounted with a fixed plate composed of two disks with different diameters. The end of the rotating shaft away from the fixed support to which it is connected is installed with a trigonal bracket with an arc-shaped top angle, and the end of the trigonal bracket away from the rotating shaft is rotatably connected to the small-diameter disk of the fixed plate.

The end surface of the trigonal bracket away from the fixed plate is provided with three circular grooves uniformly arranged along the circumferential direction of the rotating shaft, and the trigonal bracket is mounted with holding rings that are evenly arranged along the circumferential direction of the rotating shaft and concentric with the circular grooves. The holding ring is provided with sliding grooves uniformly arranged along the circumferential direction of the holding ring. The sliding groove is connected to a guide strip through a compression spring. The guide strip is mounted with an arc-shaped bearing plate. All arc-shaped bearing plates on the same holding ring form a cylindrical structure after they tightly abut together. The holding ring is installed with an opening and closing assembly for driving the movement of the arc-shaped bearing plate.

The fixed support is fixedly installed with a fixed sleeve that is sleeved on the rotating shaft and rotatably connected to the trigonal bracket, and the outer side wall of the fixed sleeve is connected to a Z-shaped bracket capable of sliding along the axial direction of the fixed sleeve. The end of the Z-shaped bracket away from the fixed sleeve is mounted with a retaining disk, and the retaining disk is rotatably connected to a hollow mandrel. The outer side wall of the hollow mandrel is equipped with receiving covers evenly arranged along the circumferential direction of the hollow mandrel by return springs. The receiving cover is rotatably connected to a correction roller and mounted with a push rod penetrating the side wall of the hollow mandrel. The end of the hollow mandrel away from the retaining disk is slidably connected to a resisting rod penetrating into the hollow mandrel, and the resisting rod is sleeved with cone columns that are evenly arranged and push the push rod to move. The diameter of the cone column gradually decreases toward the retaining disk. A tension spring sleeved on the resisting rod is connected between the inner wall of the hollow mandrel and the cone column close to the trigonal bracket. The inner ring surface of the holding ring is mounted with a fixed ring through a rib plate, and a positioning cylinder with an opening facing the rotating shaft is rotatably connected in the fixed ring.

Preferably, the opening and closing assembly includes balance bases arranged uniformly along the circumferential direction of the holding ring and installed on the holding ring by connecting rods, and the end surface of the balance base away from the connecting rod is provided with a guide groove. The convex surface of the arc-shaped bearing plate is mounted with a balance bar slidably connected to the guide groove, and an extension spring is connected between the balance bar and the guide groove. The end surface of the balance base close to the arc-shaped bearing plate is provided with a mounting groove. The mounting groove and the inner ring surface of the holding ring are both equipped with transition shafts, and the transition shafts in the holding ring are evenly arranged along the circumferential direction of the holding ring and correspond to the sliding grooves in one-to-one correspondence. A drive disk is slidably connected in the circular groove, and the end of the drive disk away from the holding ring is mounted with a T-shaped bar penetrating the trigonal bracket. A push spring sleeved on the horizontal segment of the T-shaped bar is mounted between the drive disk and the circular groove. The balance bar and the guide strip are both equipped with ropes, the ropes go around the transition shafts and then are connected to the drive disk, and the ropes all run through the holding ring. A locking assembly that drives the T-shaped bar to move is installed on the fixed plate.

Preferably, the locking assembly includes an annular groove arranged on the end surface of the large-diameter disk of the fixed plate close to the rotating shaft, and an arc-shaped baffle is installed in the annular groove. The top of the side wall of the small-diameter disk of the fixed plate is mounted with a cylinder by a vertical frame.

Preferably, the hollow mandrel is connected to a sizing assembly, and the sizing assembly includes arc-shaped boxes that are evenly arranged along the circumferential direction of the hollow mandrel and mounted on the outer side wall of the hollow mandrel through support pipes communicating the outer side wall of the hollow mandrel. The arc-shaped boxes and the correction rollers are alternately arranged. The end surface of the arc-shaped box away from the hollow mandrel is provided with evenly arranged blowing holes. The end of the hollow mandrel is rotatably connected to a conveying pipe that runs through the retaining disk and is concentric with the hollow mandrel.

Preferably, the concave surface of the receiving cover close to the correction roller is mounted with a rubber baffle and a scraper which are sequentially arranged along the rotational direction of the correction roller. The scraper is in close contact with the side wall of the correction roller. The side wall of the receiving cover is provided with a discharging opening, and a receiving slot is provided on the discharging opening. A closing sheet is slidably connected in the receiving slot. The opposite surfaces of the closing sheet and the receiving slot are mounted with opening magnets, and the magnetism of the two opening magnets is opposite. The end of the closing sheet away from the opening magnet and the opposite surface of the discharging opening are mounted with closing magnets, and the magnetism of the two closing magnets is opposite.

Preferably, the end surface of the retaining disk close to the hollow mandrel and the end surface of the holding ring close to the arc-shaped bearing plates are each mounted with a resisting ring.

Preferably, the end of the push rod away from the receiving cover is provided with a rolling ball in rolling connection.

Preferably, the end of the positioning cylinder close to the hollow mandrel is an arc-shaped inclined surface whose diameter gradually decreases toward the center of the fixed ring.

The present invention has the following advantages: 1. In the permeate tube member correction device designed by the present invention, the rotation of the hollow mandrel drives the correction roller to roll along the inner wall of the permeate tube member, so that the roundness and straightness of the permeate tube member is corrected, thereby improving the quality of the permeate tube member and avoiding certain deformation that may be produced when cooling during the production process of the permeate tube member due to its weight and may affect the subsequent processing, installation, and use of the permeate tube member. At the same time, a plurality of correction rollers are inserted into the permeate tube member and then expanded to contact the inner wall of the permeate tube member, so that the permeate tube member is only forced by the correction via circumferential rotation, avoiding the problem of the axial deformation of the permeate tube member caused by contact friction between the correction rollers and the inner wall of the permeate tube member when the correction rollers move into the permeate tube member.

2. In the present invention, the hollow mandrel is inserted into the positioning cylinder and then rotates, so that the positioning cylinder supports the end of the hollow mandrel, which prevents one end of the hollow mandrel from being suspended and avoids the poor correction effect of the permeate tube member caused by the centrifugal force of the hollow mandrel during the rotation process.

3. In the present invention, during the rotation of the correction roller, the materials adhering to the side wall of the correction roller from the inner wall of the permeate tube member are removed by the scraper when they contact the scraper after passing through the rubber baffle, which prevents the materials stuck on the correction roller from affecting the correction effect of the correction roller on the permeate tube member. Moreover, the rubber baffle and the scraper function to avoid the problem that the scraped materials are scattered around when the hollow mandrel rotates.

BRIEF DESCRIPTION OF THE DRAWINGS

The present invention will be further described below in conjunction with the accompanying drawings and embodiments.

In the figures: 1. fixed support; 10. fixed sleeve; 11. Z-shaped bracket; 12. retaining disk; 13. hollow mandrel; 130. support pipe; 131. arc-shaped box; 132. blowing hole; 133. conveying pipe; 14. return spring; 15. receiving cover; 150. rubber baffle; 151. scraper; 152. discharging opening; 153. receiving slot; 154. closing sheet; 155. opening magnet; 156. closing magnet; 16. correction roller; 17. push rod; 18. resisting rod; 19. cone column; 20. tension spring; 21. fixed ring; 22. positioning cylinder; 2. rotating shaft; 3. fixed plate; 30. resisting ring; 4. trigonal bracket; 40. circular groove; 41. holding ring; 42. sliding groove; 43. guide strip; 45. arc-shaped bearing plate; 5. opening and closing assembly; 50. balance base; 51. balance bar; 52. extension spring; 53. mounting groove; 54. drive disk; 55. T-shaped bar; 56. push spring; 57. locking assembly; 570. annular groove; 571. arc-shaped baffle; 572. cylinder; 6. permeate tube member.

DETAILED DESCRIPTION OF THE EMBODIMENTS

The embodiments of the present invention will be described in detail below with reference to the accompanying drawings, but the present invention can be implemented in many different ways defined and covered by the claims.

Figure 1:
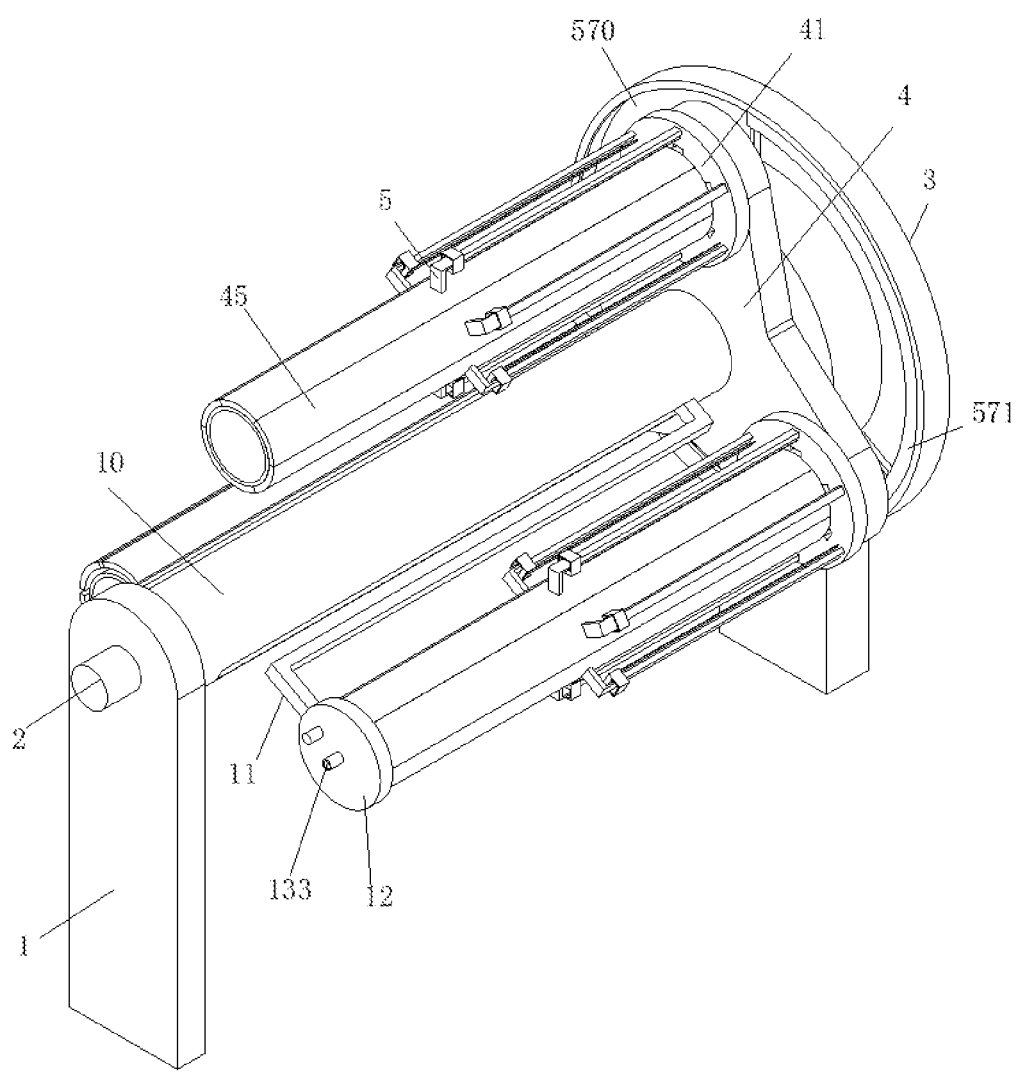
FIG. 1 is a main perspective view showing the structure of the present invention.
Figure 2:
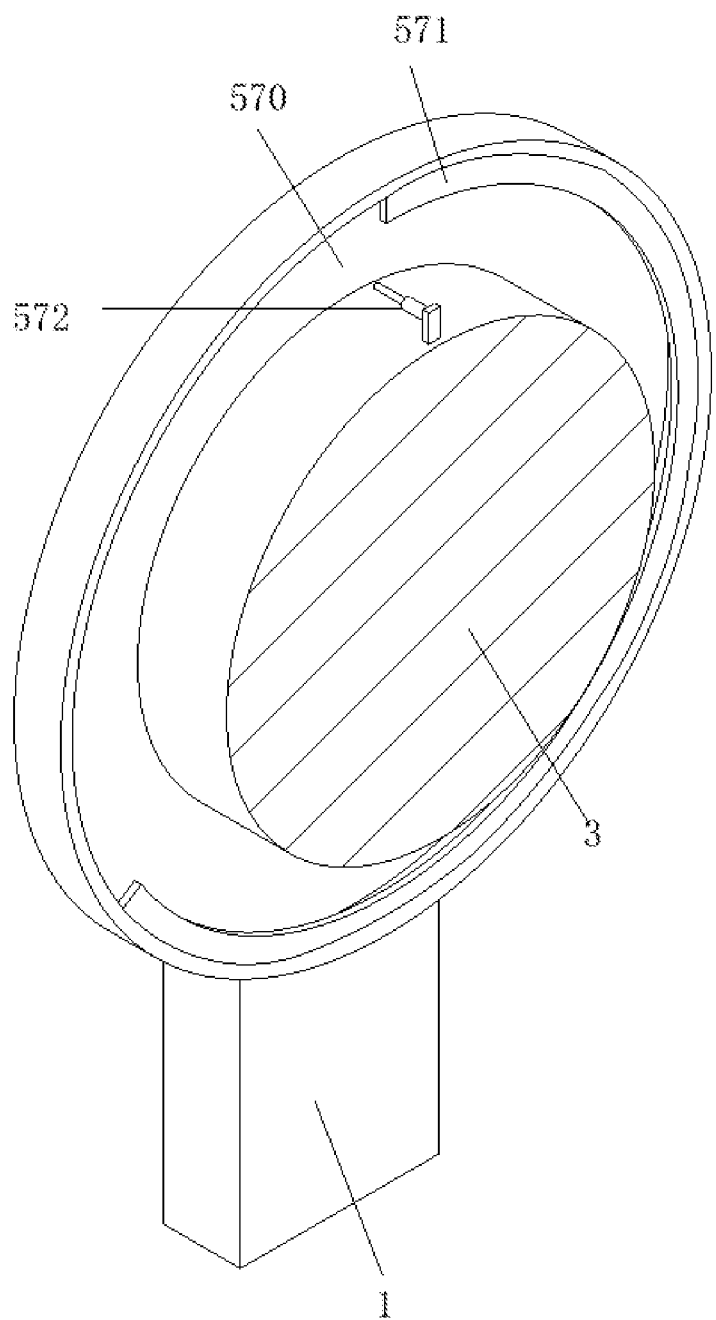
FIG. 2 is a partial perspective view showing the structure of the present invention.
Figure 3:
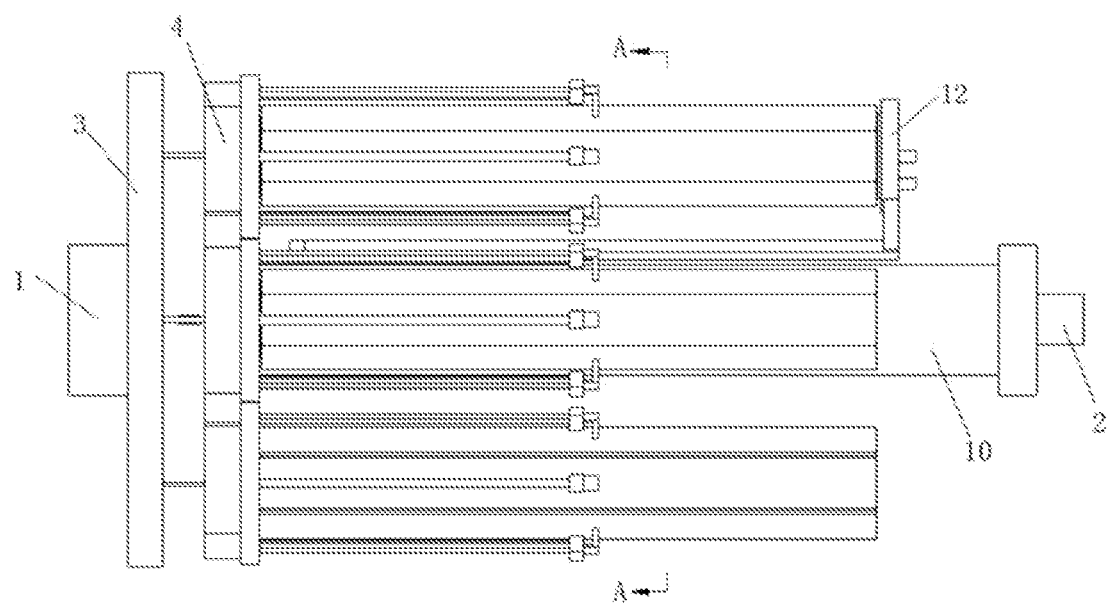
FIG. 3 is a top view of the present invention.
Figure 4:
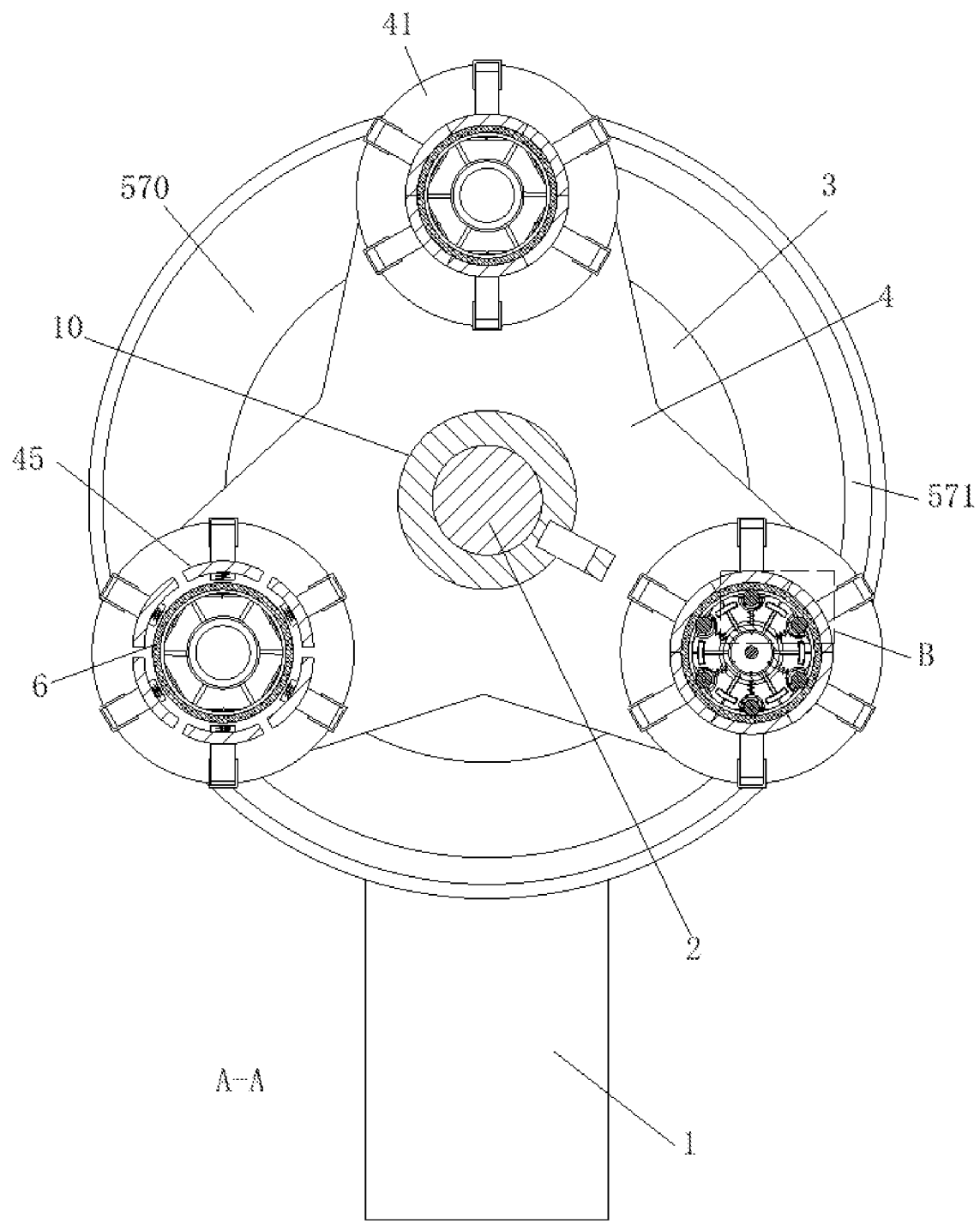
FIG. 4 is an A-A sectional view of FIG. 3 of the present invention.

Referring to FIG. 1 and FIG. 3, a permeate tube member correction device includes two fixed supports 1, where one fixed support 1 is rotatably connected to the rotating shaft 2, and the other fixed support 1 is fixedly mounted with the fixed plate 3 composed of two disks with different diameters. The end of the rotating shaft 2 away from the fixed support 1 to which it is connected is installed with the trigonal bracket 4 with an arc-shaped top angle, and the end of the trigonal bracket 4 away from the rotating shaft 2 is rotatably connected to the small-diameter disk of the fixed plate 3.

Figure 8:
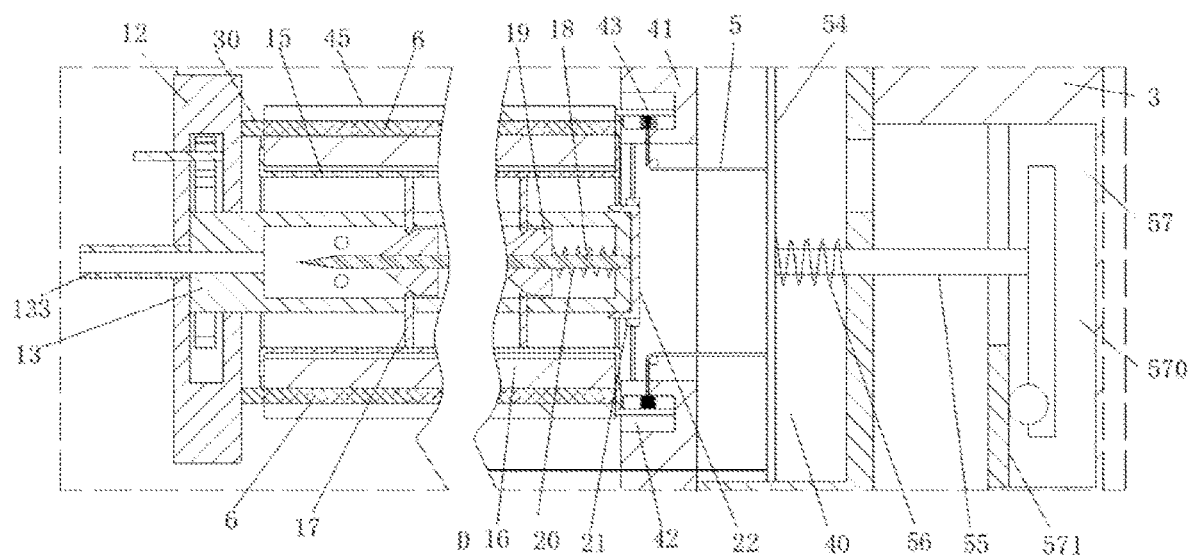
FIG. 8 is an enlarged view showing the part D in FIG. 7 of the present invention.

Referring to FIG. 1 and FIG. 8, the end surface of the trigonal bracket 4 away from the fixed plate 3 is provided with three circular grooves 40 uniformly arranged along the circumferential direction of the rotating shaft 2, and the trigonal bracket 4 is mounted with holding rings 41 that are evenly arranged along the circumferential direction of the rotating shaft 2 and concentric with the circular grooves 40. The holding ring 41 is provided with sliding grooves 42 uniformly arranged along the circumferential direction of the holding ring 41. The sliding groove 42 is connected to the guide strip 43 through a compression spring. The guide strip 43 is mounted with the arc-shaped bearing plate 45. All arc-shaped bearing plates 45 on the same holding ring 41 form a cylindrical structure after they tightly abut together. The holding ring 41 is installed with the opening and closing assembly 5 for driving the movement of the arc-shaped bearing plate 45.

Referring to FIG. 1, FIG. 5, FIG. 7, and FIG. 8, the fixed support 1 is fixedly installed with the fixed sleeve 10 that is sleeved on the rotating shaft 2 and rotatably connected to the trigonal bracket 4, and the outer side wall of the fixed sleeve 10 is connected to the Z-shaped bracket 11 capable of sliding along the axial direction of the fixed sleeve 10. The end of the Z-shaped bracket 11 away from the fixed sleeve 10 is mounted with the retaining disk 12, and the retaining disk 12 is rotatably connected to the hollow mandrel 13. The outer side wall of the hollow mandrel 13 is equipped with receiving covers 15 evenly arranged along the circumferential direction of the hollow mandrel 13 by return springs 14. The receiving cover 15 is rotatably connected to the correction roller 16 and mounted with the push rod 17 penetrating the side wall of the hollow mandrel 13. The end of the hollow mandrel 13 away from the retaining disk 12 is slidably connected to the resisting rod 18 penetrating into the hollow mandrel 13, and the resisting rod 18 is sleeved with cone columns 19 that are evenly arranged and push the push rod 17 to move. The diameter of the cone column 19 gradually decreases toward the retaining disk 12. The tension spring 20 sleeved on the resisting rod 18 is connected between the inner wall of the hollow mandrel 13 and the cone column 19 close to the trigonal bracket 4. The inner ring surface of the holding ring 41 is mounted with the fixed ring 21 through a rib plate, and the positioning cylinder 22 with an opening facing the rotating shaft 2 is rotatably connected in the fixed ring 21.

Referring to FIG. 1 and FIG. 8, the retaining disk 12 is provided with a connecting groove, and the connective groove is rotatably connected to a drive shaft. The end of the drive shaft away from the hollow mandrel 13 penetrates the retaining disk 12 and then is connected to an external drive device (such as a drive motor). The outer wall of the hollow mandrel 13 entering the connecting groove and the outer wall of the drive shaft located in the connecting groove are both fixedly provided with gears that are meshed for transmission.

A loading station is arranged directly above the rotating shaft 2, a correction station is arranged at the position where the rotating shaft 2 is aligned with the hollow mandrel 13, a discharging station is arranged at the side of the rotating shaft 2 away from the hollow mandrel 13, and the three stations form a regular triangle arrangement. The end of the rotating shaft 2 away from the trigonal bracket 4 penetrates the fixed support 1 to which the rotating shaft 2 is connected and then is connected to an external drive motor that drives the rotating shaft 2 to rotate intermittently. When the arc-shaped bearing plates 45 on the holding ring 41 rotate to the loading station and the discharging station, they are in a naturally opening state, so that the permeate tube member 6 can be placed and removed.

Subsequently, when the rotating shaft 2 drives the permeate tube member 6 to rotate to the correction station and stop, the Z-shaped bracket 11 is driven by an external drive device (such as an electric slider) connected to the Z-shaped bracket 11 to move to the trigonal bracket 4, and at this time, the retaining disk 12 drives the hollow mandrel 13 and the correction roller 16 to enter the permeate tube member 6. When the end of the hollow mandrel 13 away from the retaining disk 12 is inserted into the positioning cylinder 22, and the resisting rod 18 does not move after tightly abutting against the inner wall of the positioning cylinder 22, the hollow mandrel 13 drives the correction roller 16 to continue to move towards the trigonal bracket 4, and the push rod 17 contacts the side wall of the cone column 19 on the resisting rod 18 and moves along the inclined side wall of the cone column 19. During the movement of the push rod 17, the push rod 17 pushes the correction roller 16 to move towards the inner side wall of the permeate tube member 6. At this time, the return spring 14 and the tension spring 20 are both in a stretched state. Once the hollow mandrel 13 tightly abuts against the positioning cylinder 22, the correction roller 16 contacts the inner side wall of the permeate tube member 6 and enables the side wall of the permeate tube member 6 to abut against the arc-shaped bearing plates 45. Then, the drive shaft rotates and drives the hollow mandrel 13 to rotate through the meshed gears, and the rotation of the hollow mandrel 13 drives the correction roller 16 to roll along the inner wall of the permeate tube member 6, so that the roundness and straightness of the permeate tube member 6 is corrected, thereby improving the quality of the permeate tube member 6 and avoiding certain deformation that may be produced when cooling during the production process of the permeate tube member 6 due to its weight and may affect the subsequent processing, installation, and use of the permeate tube member 6.

After the hollow mandrel 13 is inserted into the positioning cylinder 22, the positioning cylinder 22 supports the end of the hollow mandrel 13, which prevents one end of the hollow mandrel 13 from being suspended and avoids the poor correction effect of the permeate tube member 6 caused by the centrifugal force of the hollow mandrel 13 during the rotation process. Moreover, a plurality of correction rollers 16 are inserted into the permeate tube member 6 and then expanded to contact the inner wall of the permeate tube member 6, so that the permeate tube member 6 is only forced by the correction via circumferential rotation, avoiding the problem of the axial deformation of the permeate tube member 6 caused by contact friction between the correction rollers 16 and the inner wall of the permeate tube member 6 when the correction rollers 16 move into the permeate tube member 6.

Figure 9:
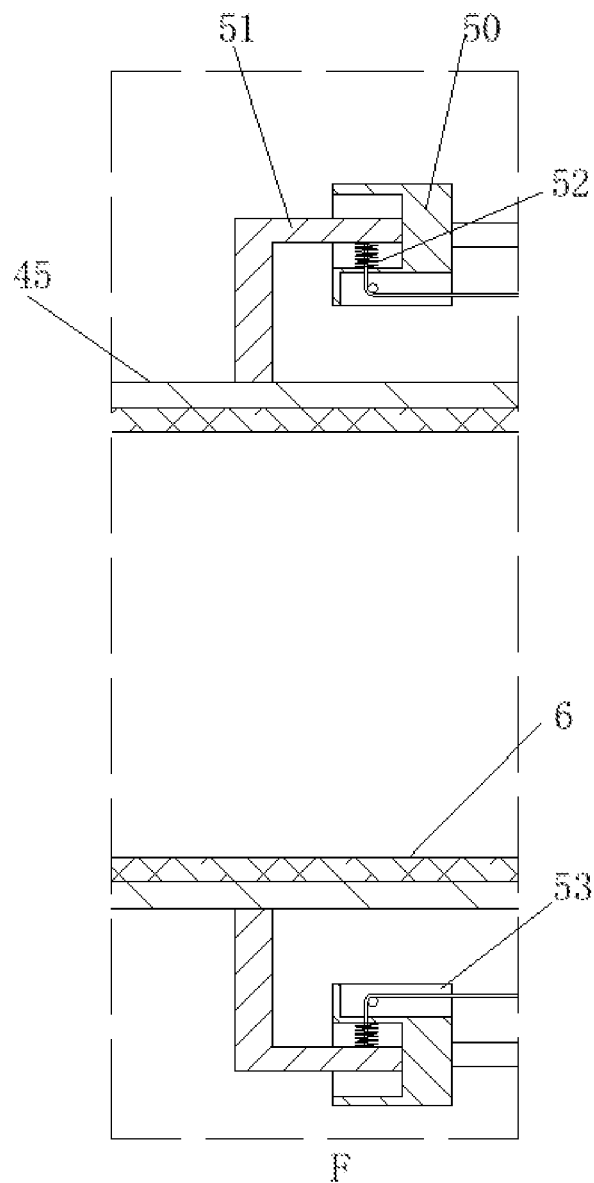
FIG. 9 is an enlarged view showing the part F in FIG. 7 of the present invention.

Referring to FIG. 1, FIG. 8, and FIG. 9, the opening and closing assembly 5 includes balance bases 50 arranged uniformly along the circumferential direction of the holding ring 41 and installed on the holding ring 41 by connecting rods, and the end surface of the balance base 50 away from the connecting rod is provided with a guide groove. The convex surface of the arc-shaped bearing plate 45 is mounted with the balance bar 51 slidably connected to the guide groove, and the extension spring 52 is connected between the balance bar 51 and the guide groove. The end surface of the balance base 50 close to the arc-shaped bearing plate 45 is provided with the mounting groove 53. The mounting groove 53 and the inner ring surface of the holding ring 41 are both equipped with transition shafts, and the transition shafts in the holding ring 41 are evenly arranged along the circumferential direction of the holding ring 41 and correspond to the sliding grooves 42 in one-to-one correspondence. The drive disk 54 is slidably connected in the circular groove 40, and the end of the drive disk 54 away from the holding ring 41 is mounted with the T-shaped bar 55 penetrating the trigonal bracket 4. The push spring 56 sleeved on the horizontal segment of the T-shaped bar 55 is mounted between the drive disk 54 and the circular groove 40. The balance bar 51 and the guide strip 43 are both equipped with ropes, the ropes go around the transition shafts and then are connected to the drive disk 54, and the ropes all run through the holding ring 41. The locking assembly 57 that drives the T-shaped bar 55 to move is installed on the fixed plate 3.

Referring to FIG. 2, FIG. 4, FIG. 6, and FIG. 8, the locking assembly 57 includes the annular groove 570 arranged on the end surface of the large-diameter disk of the fixed plate 3 close to the rotating shaft 2, and the arc-shaped baffle 571 is installed in the annular groove 570. The top of the side wall of the small-diameter disk of the fixed plate 3 is mounted with the cylinder 572 by a vertical frame.

After placing the permeate tube member 6 on the arc-shaped bearing plates 45 from the loading station, the vertical segment of the T-shaped bar 55 is pushed by the cylinder 572, so that the T-shaped bar 55 pulls the drive disk 54 and the ropes to move to the fixed plate 3. The ropes pull the balance bar 51 and the guide strip 43 during the movement, so that the arc-shaped bearing plates 45 move toward the permeate tube member 6 until the plurality of arc-shaped bearing plates 45 wrap and clamp the permeate tube member 6. Subsequently, the rotating shaft 2 drives the trigonal bracket 4 to rotate, and the vertical segment of the T-shaped bar 55 moves from the cylinder 572 to the position between the arc-shaped baffle 571 and the annular groove 570 and tightly abuts against the arc-shaped baffle 571. During the rotation of the trigonal bracket 4, the rolling ball that is in rolling connection with the T-shaped bar 55 rolls along the side wall of the arc-shaped baffle 571, so that when the permeate tube member 6 moves to the correction station, the arc-shaped bearing plates 45 still clamp the permeate tube member 6, thus facilitating the correction of the correction roller 16 to the permeate tube member 6.

Referring to FIG. 8, the end surface of the retaining disk 12 close to the hollow mandrel 13 and the end surface of the holding ring 41 close to the arc-shaped bearing plates 45 are each mounted with the resisting ring 30, and the resisting ring 30 contacts the end of the permeate tube member 6, thereby increasing the friction force between the permeate tube member 6 and the resisting ring 30 and preventing the permeate tube member 6 from rotating along with the rotation of the correction roller 16.

Referring to FIG. 8, the end of the push rod 17 away from the receiving cover 15 is provided with a rolling ball in rolling connection, and the rolling ball is in rolling contact with the cone column 19, so that the push rod 17 moves along the side wall of the cone column 19.

Referring to FIG. 8, the end of the positioning cylinder 22 close to the hollow mandrel 13 is an arc-shaped inclined surface whose diameter gradually decreases toward the center of the fixed ring 21, thereby somewhat guiding the insertion of the hollow mandrel 13, correcting the centers of two ends of the hollow mandrel 13 to be horizontal, and avoiding the poor correction quality of the permeate tube member 6 caused by the offset of the hollow mandrel 13.

Figure 5:
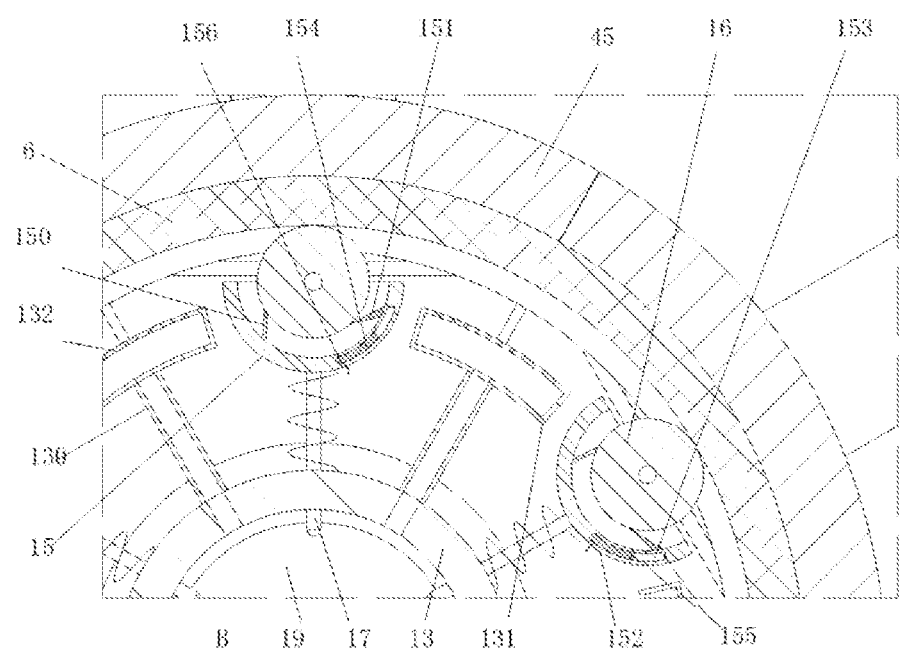
FIG. 5 is an enlarged view showing the part B in FIG. 4 of the present invention.
Figure 6:
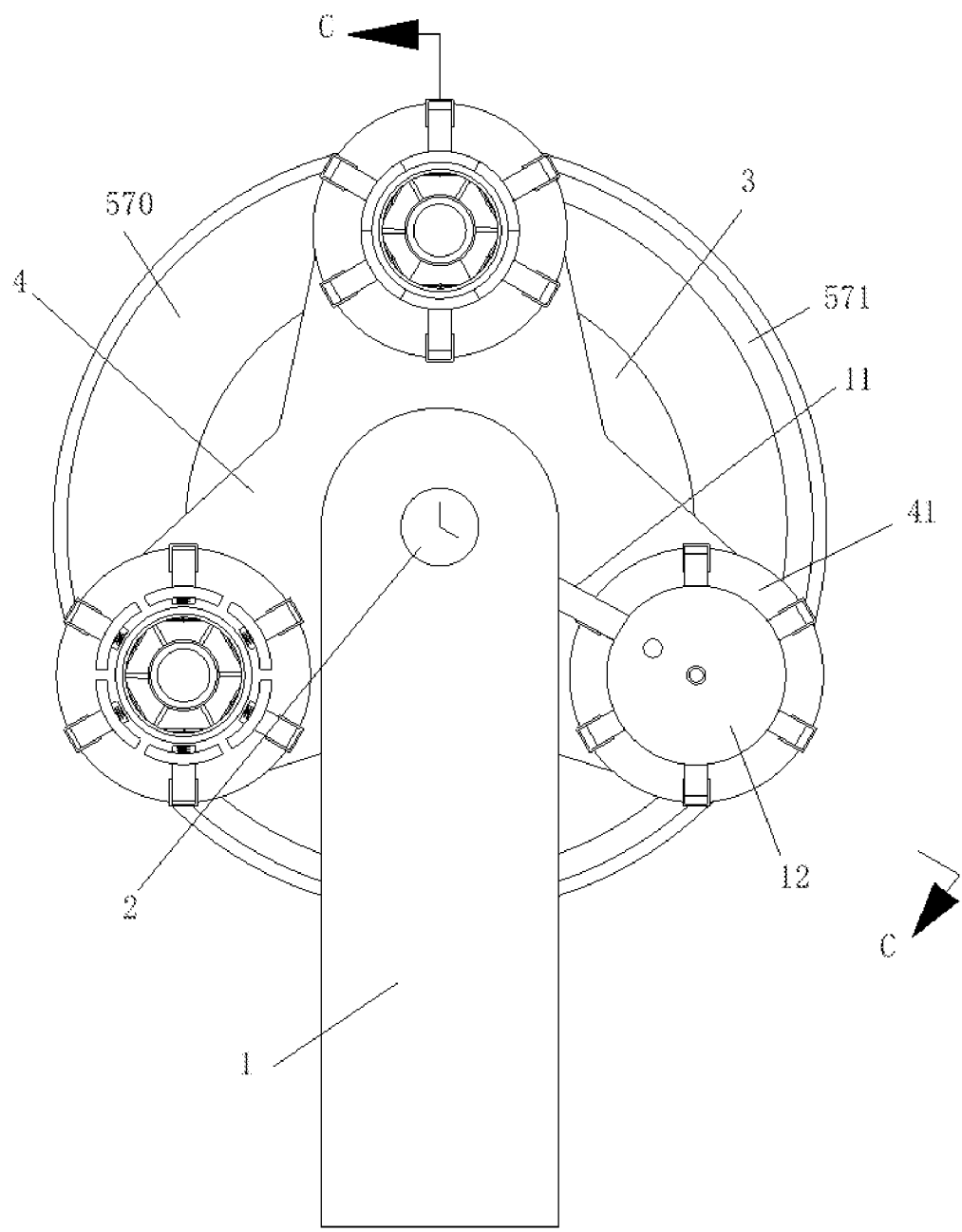
FIG. 6 is a front view of the present invention.
Figure 7:
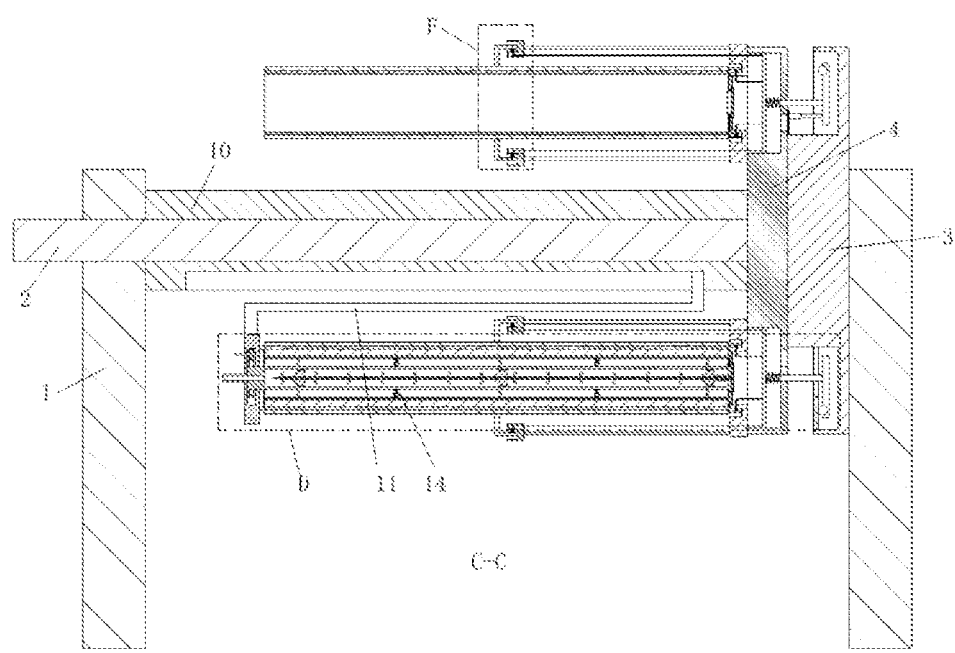
FIG. 7 is a C-C sectional view of FIG. 6 of the present invention.

Referring to FIG. 5 and FIG. 8, the hollow mandrel 13 is connected to a sizing assembly, and the sizing assembly includes arc-shaped boxes 131 that are evenly arranged along the circumferential direction of the hollow mandrel 13 and mounted on the outer side wall of the hollow mandrel 13 through support pipes 130 communicating the outer side wall of the hollow mandrel 13. The arc-shaped boxes 131 and the correction rollers 16 are alternately arranged. The end surface of the arc-shaped box 131 away from the hollow mandrel 13 is provided with evenly arranged blowing holes 132. The end of the hollow mandrel 13 is rotatably connected to the conveying pipe 133 that runs through the retaining disk 12 and is concentric with the hollow mandrel 13.

The conveying pipe 133 is connected to an external blower fan. During the rotation of the hollow mandrel 13, the conveying pipe 133 conveys wind into the hollow mandrel 13. The wind blows to the permeate tube member 6 through the support pipes 130, the arc-shaped boxes 131, and the blowing holes 132, so that the permeate tube member 6 is cooled and shaped. The alternate arrangement of the arc-shaped boxes 131 and the correction rollers 16 allows the permeate tube member 6 to be corrected and shaped concurrently. The trigonal bracket 4 is provided with vent holes communicating the circular grooves 40, facilitating the discharge of cooled gas.

Referring to FIG. 5, the concave surface of the receiving cover 15 close to the correction roller 16 is mounted with the rubber baffle 150 and the scraper 151 which are sequentially arranged along the rotational direction of the correction roller 16. The scraper 151 is in close contact with the side wall of the correction roller 16. The side wall of the receiving cover 15 is provided with the discharging opening 152, and the receiving slot 153 is provided on the discharging opening 152. The closing sheet 154 is slidably connected in the receiving slot 153. The opposite surfaces of the closing sheet 154 and the receiving slot 153 are mounted with opening magnets 155, and the magnetism of the two opening magnets 155 is opposite. The end of the closing sheet 154 away from the opening magnet 155 and the surface opposite to the discharging opening 152 are mounted with closing magnets 156, and the magnetism of the two closing magnets 156 is opposite.

During the rotation of the correction roller 16, the materials adhering to the side wall of the correction roller 16 from the inner wall of the permeate tube member 6 are removed by the scraper 151 when they contact the scraper 151 after passing through the rubber baffle 150, which prevents the materials stuck on the correction roller 16 from affecting the correction effect of the correction roller 16 on the permeate tube member 6. Moreover, the rubber baffle 150 and the scraper 151 function to avoid the problem that the scraped materials are scattered around when the hollow mandrel 13 rotates. When the materials in the receiving cover 15 need to be cleaned, the closing sheet 154 is pulled to move into the receiving slot 153, so that the two opening magnets 155 are adsorbed for fixing, then the hollow mandrel 13 is rotated to rotate the receiving cover 15, and the materials are discharged from the discharging opening 152 to complete the cleaning.

During work, the rotating shaft 2 drives the trigonal bracket 4 to rotate intermittently. When the rotating shaft 2 stops intermittently, the permeate tube member 6 that is not completely cooled and shaped after forming is placed on the arc-shaped support plates 45 at the loading station, and then the opening and closing assembly 5 drives the plurality of expanded arc-shaped bearing plates 45 to move towards the permeate tube member 6 until the plurality of arc-shaped bearing plates 45 tightly abut against the permeate tube member 6 to form a cylindrical structure. At this time, the concave surface of the arc-shaped bearing plate 45 is in close contact with the outer side wall of the permeate tube member 6 to clamp and fix the permeate tube member 6 from outside and meanwhile to play a supporting role for the permeate tube member 6 in the process of straightness and roundness correction.

Afterwards, when the rotating shaft 2 drives the permeate tube member 6 to rotate to the correction station and stop, the Z-shaped bracket 11 is driven by an external drive device (such as an electric slider) connected to the Z-shaped bracket 11 to move to the trigonal bracket 4, and at this time, the retaining disk 12 drives the hollow mandrel 13 and the correction roller 16 to enter the permeate tube member 6. When the end of the hollow mandrel 13 away from the retaining disk 12 is inserted into the positioning cylinder 22, and the resisting rod 18 does not move after tightly abutting against the inner wall of the positioning cylinder 22, the hollow mandrel 13 drives the correction roller 16 to continue to move towards the trigonal bracket 4, and the push rod 17 contacts the side wall of the cone column 19 on the resisting rod 18 and moves along the inclined side wall of the cone column 19. During the movement of the push rod 17, the push rod 17 pushes the correction roller 16 to move towards the inner side wall of the permeate tube member 6. At this time, the return spring 14 and the tension spring 20 are both in a stretched state. Once the hollow mandrel 13 tightly abuts against the positioning cylinder 22, the correction roller 16 contacts the inner side wall of the permeate tube member 6 and enables the side wall of the permeate tube member 6 to abut against the arc-shaped bearing plates 45. Then, the drive shaft rotates and drives the hollow mandrel 13 to rotate through the meshed gears, and the rotation of the hollow mandrel 13 drives the correction roller 16 to roll along the inner wall of the permeate tube member 6, so that the roundness and straightness of the permeate tube member 6 is corrected, thereby improving the quality of the permeate tube member 6 and avoiding certain deformation that may be produced when cooling during the production process of the permeate tube member 6 due to its weight and may affect the subsequent processing, installation, and use of the permeate tube member 6.

Furthermore, during the rotation of the hollow mandrel 13, the conveying pipe 133 conveys wind into the hollow mandrel 13. The wind blows to the permeate tube member 6 through the support pipes 130, the arc-shaped boxes 131, and the blowing holes 132, so that the permeate tube member 6 is cooled and shaped. The alternate arrangement of the arc-shaped boxes 131 and the correction rollers 16 allows the permeate tube member 6 to be corrected and shaped concurrently.

After the permeate tube member 6 is corrected, the rotating shaft 2 drives the permeate tube member 6 to move to the discharging station, the arc-shaped bearing plates 45 fixing the permeate tube member 6 expand, and then the permeate tube member 6 is removed.

In addition, it should be understood that although the present specification is described according to embodiments, it cannot be regarded that each embodiment only contains an independent technical solution. The description of the specification is merely for clarity, and those skilled in the art should take the specification as a whole. The technical solutions in the various embodiments can also be properly combined to form other embodiments that can be understood by those skilled in the art.

What is claimed is:

1. A permeate tube member correction device, comprising: a first fixed support (1) and a second fixed support (1), wherein the first fixed support (1) is rotatably connected to a rotating shaft (2), and the second fixed support (1) is fixedly mounted with a fixed plate (3) composed of a first disk and a second disk, a diameter of the first disk is smaller than a diameter of the second disk, an end of the rotating shaft (2) away from the first fixed support (1) to which it is connected is installed with a trigonal bracket (4) with an arc-shaped top angle, and an end of the trigonal bracket (4) away from the rotating shaft (2) is rotatably connected to the first disk of the fixed plate (3);

an end surface of the trigonal bracket (4) away from the fixed plate (3) is provided with three circular grooves (40) uniformly arranged along a circumferential direction of the rotating shaft (2), and the trigonal bracket (4) is mounted with holding rings (41) that are evenly arranged along the circumferential direction of the rotating shaft (2) and concentric with the three circular grooves (40), each of the holding rings (41) is provided with sliding grooves (42) uniformly arranged along a circumferential direction of each of the holding rings (41), the sliding grooves (42) are connected to guide strips (43) through compression springs, the guide strips (43) are mounted with arc-shaped bearing plates (45), all arc-shaped bearing plates (45) on each of the holding rings (41) tightly abut together to form a cylindrical structure, each of the holding rings (41) is installed with an opening and closing assembly (5) for driving a movement of the arc-shaped bearing plates (45);

the first fixed support (1) is fixedly installed with a fixed sleeve (10) that is sleeved on the rotating shaft (2) and rotatably connected to the trigonal bracket (4), and an outer side wall of the fixed sleeve (10) is connected to a Z-shaped bracket (11) capable of sliding along an axial direction of the fixed sleeve (10), an end of the Z-shaped bracket (11) away from the fixed sleeve (10) is mounted with a retaining disk (12), the retaining disk (12) is rotatably connected to a hollow mandrel (13), an outer side wall of the hollow mandrel (13) is equipped with receiving covers (15) evenly arranged along a circumferential direction of the hollow mandrel (13) by return springs (14), each of the receiving covers (15) is rotatably connected to a correction roller (16) and mounted with a push rod (17) penetrating the outer side wall of the hollow mandrel (13), a first end of the hollow mandrel (13) away from the retaining disk (12) is slidably connected to a resisting rod (18) penetrating into the hollow mandrel (13), the resisting rod (18) is sleeved with cone columns (19) that are evenly arranged and push the push rod (17) to move, a diameter of each of the cone columns (19) gradually decreases toward the retaining disk (12), a tension spring (20) sleeved on the resisting rod (18) is connected between an inner wall of the hollow mandrel (13) and each of the cone columns (19) close to the trigonal bracket (4), an inner ring surface of each of the holding rings (41) is mounted with a fixed ring (21) through a rib plate, and a positioning cylinder (22) with an opening facing the rotating shaft (2) is rotatably connected in the fixed ring (21);

the opening and closing assembly (5) comprises balance bases (50) arranged uniformly along the circumferential direction of each of the holding rings (41) and installed on each of the holding rings (41) by connecting rods, an end surface of each of the balance bases (50) away from the connecting rods is provided with a guide groove, a convex surface of each of the arc-shaped bearing plates (45) is mounted with a balance bar (51) slidably connected to the guide groove, an extension spring (52) is connected between the balance bar (51) and the guide groove, an end surface of the balance base (50) close to each of the arc-shaped bearing plates (45) is provided with a mounting groove (53), the mounting groove (53) and the inner ring surface of each of the holding rings (41) are both equipped with transition shafts, the transition shafts in the holding rings (41) are evenly arranged along the circumferential direction of each of the holding rings (41) and correspond to the sliding grooves (42) in one-to-one correspondence, a drive disk (54) is slidably connected in each of the three circular grooves (40), an end of the drive disk (54) away from each of the holding rings (41) is mounted with a T-shaped bar (55) penetrating the trigonal bracket (4), a push spring (56) sleeved on a horizontal segment of the T-shaped bar (55) is mounted between the drive disk (54) and each of the three circular grooves (40), the balance bar (51) and each of the guide strips (43) are both equipped with ropes, the ropes go around the transition shafts and then are connected to the drive disk (54), the ropes all run through each of the holding rings (41), a locking assembly (57) that drives the T-shaped bar (55) to move is installed on the fixed plate (3);

the locking assembly (57) comprises an annular groove (570) arranged on an end surface of the second disk of the fixed plate (3) close to the rotating shaft (2), an arc-shaped baffle (571) is installed in the annular groove (570), a top of a side wall of the second disk of the fixed plate (3) is mounted with a cylinder (572) by a vertical frame.

2. The permeate tube member correction device according to claim 1, wherein a concave surface of each of the receiving covers (15) close to the correction roller (16) is mounted with a rubber baffle (150) and a scraper (151) which are sequentially arranged along a rotational direction of the correction roller (16), the scraper (151) is in close contact with a side wall of the correction roller (16), a side wall of each of the receiving covers (15) is provided with a discharging opening (152), a receiving slot (153) is provided on the discharging opening (152), a closing sheet (154) is slidably connected in the receiving slot (153), opposite surfaces of the closing sheet (154) and the receiving slot (153) are mounted with two opening magnets (155), magnetism of the two opening magnets (155) is opposite, an end of the closing sheet (154) away from the two opening magnets (155) and a surface opposite to the discharging opening (152) are mounted with two closing magnets (156), and magnetism of the two closing magnets (156) is opposite.

3. The permeate tube member correction device according to claim 1, wherein the hollow mandrel (13) is connected to a sizing assembly, and the sizing assembly comprises arc-shaped boxes (131) that are evenly arranged along the circumferential direction of the hollow mandrel (13) and mounted on the outer side wall of the hollow mandrel (13) through support pipes (130) communicating the outer side wall of the hollow mandrel (13), the arc-shaped boxes (131) and the correction rollers (16) are alternately arranged, an end surface of each of the arc-shaped boxes (131) away from the hollow mandrel (13) is provided with evenly arranged blowing holes (132), a second end of the hollow mandrel (13) is rotatably connected to a conveying pipe (133) that runs through the retaining disk (12) and is concentric with the hollow mandrel (13).

4. The permeate tube member correction device according to claim 1, wherein an end surface of the retaining disk (12) close to the hollow mandrel (13) and an end surface of each of the holding rings (41) close to each of the arc-shaped bearing plates (45) are each mounted with a resisting ring (30).

5. The permeate tube member correction device according to claim 1, wherein an end of the push rod (17) away from each of the receiving covers (15) is provided with a rolling ball in rolling connection.

6. The permeate tube member correction device according to claim 1, wherein an end of the positioning cylinder (22) close to the hollow mandrel (13) is an arc-shaped inclined surface with a diameter gradually decreasing toward a center of the fixed ring (21).

* * * * *